Figures 1, 2:
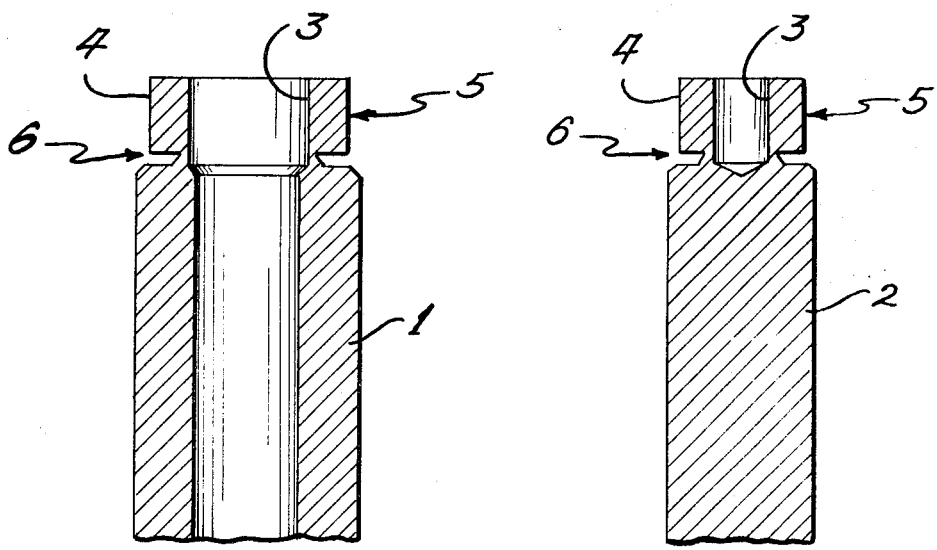

United States Patent [19]
Knapp

[11] 3,737,965
[45] June 12, 1973

[54] ROLLER BEARING RINGS
[75] Inventor: Edward Ronald Knapp, Duston, England
[73] Assignee: The Timken Company, Canton, Ohio
[22] Filed: June 14, 1971
[21] Appl. No.: 152,703

[30] Foreign Application Priority Data
June 18, 1970 Great Britain.................. 29,747/70

[52] U.S. Cl.... 29/148.4 R, 29/DIG. 26, 29/DIG. 47
[51] Int. Cl....... B21h 1/12, B21k 1/04, B23p 11/00
[58] Field of Search............... 29/148.4 R, 148.4 A, 29/DIG. 26, DIG. 47

[56]  References Cited
UNITED STATES PATENTS
| | | | |
|---|---|---|---|
| 1,326,225 | 12/1919 | Timken | 29/148.4 R |
| 2,913,811 | 11/1959 | Benson | 29/148.4 R |
| 3,378,903 | 4/1968 | Cardillo | 29/148.4 R |
| 3,496,619 | 2/1970 | Constant | 29/148.4 R |

*Primary Examiner*—Thomas H. Eager
*Attorney*—Gravely, Lieder & Woodruff

[57] ABSTRACT

Annular mechanical elements such as bearing rings for roller bearings are manufactured by forming an annular steel blank of predetermined dimensions by a machining operation and subjecting the blank to a cold extrusions operation to provide an annular element of desired shape. The blank may be formed by the cold extrusion process into a multiplex structure which can be separated by a punching operation into two or more annular elements each of desired shape. The machining operation may be performed on the end of a seamless steel tube or a hot roller steel bar and the desired annular blank is then separated by a parting operation.

8 Claims, 4 Drawing Figures

PATENTED JUN 12 1973 3,737,965

INVENTOR:
Edward R. Knapp
BY Gravely, Lieder & Woodruff
ATTORNEYS.

ROLLER BEARING RINGS

The invention relates to the manufacture of annular steel mechanical elements such as rolling bearing rings, for instance a cup and cone for a tapered roller bearing.

It is common practice to produce such parts by separating out the portions of a duplex form which has been extruded from an annular blank. The annular blank is produced from steel bar stock by the following series of operations.

- The bar stock is ground to an even diameter and roundness.
- A solid blank is cropped from the bar, the volume or weight of the blank being carefully controlled
- Degreasing
- Barrelling to remove sharp edges
- Pickling, phosphating and soaping
- Truing the end of the blank
- The blank is then pressed to shorten it and increase diameter
- Alkali washing
- Annealing
- Phosphating and soaping
- Indenting and piercing the blank to produce an annular form
- Alkali washing
- Annealing
- Phosphating and soaping.

The annular blank thus produced can then be extruded into a duplex form which is subsequently punched to produce the separate bearing rings.

It will be seen that a total of 15 operations are required to produce the annular blank. These operations are time consuming require special machinery and factory space, and are expensive in materials. Consequently they tend to dissipate the economic advantages looked for in the way of material savings by such use of simple bar stock and the chipless preparation of work pieces.

It is among the objects of the invention to provide a method of manufacturing annular mechanical elements in a simpler and faster manner.

The invention therefore provides a method of manufacturing annular mechanical elements of steel which comprises forming an annular steel blank of predetermined dimensions by machining and subjecting the blank to a cold extrusion operation to form an annular element of desired shape.

Preferably the steel blank is formed by the cold extrusion operation into a multiplex structure which is then separated into portions, each comprising an annular element of desired shape, by a punching operation. The portions may be part of a duplex structure and when separated may constitute the cup and cone of a tapered roller bearing.

The annular metal blank is preferably machined to its desired internal and external dimensions whilst forming an end portion of a seamless steel tube or (for the smaller bearing sizes) a round hot rolled steel bar. The blank is then parted from the tube or bar stock and subjected to the conventional preparatory procedures of degreasing, barrelling, phosphating and soaping before subjection to the extrusion and punching steps.

The invention also provides annular mechanical elements when manufactured by the method of the invention.

Figure 3:
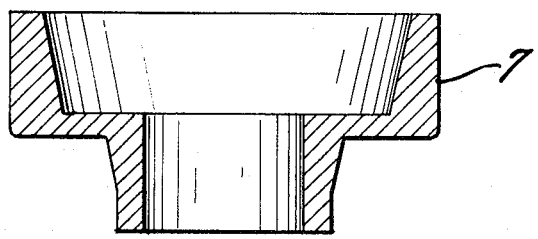
Figure 4:
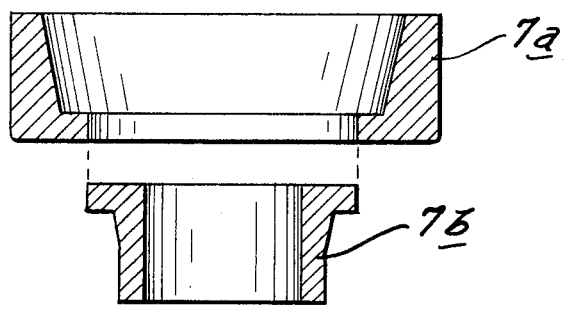

The invention will now be described with reference to the accompanying drawings in which:

FIG. 1 is an axial section through an end portion of round hot rolled seamless steel tube stock with a partly formed annular element thereon, FIG. 2 is an axial section through an end portion of round hot rolled steel bar stock also showing an annular element part formed thereon, FIG. 3 is an axial section through a duplex form of the kind extruded from the annular element shown in FIGS. 1 and 2, and FIG. 4 is an axial section through the duplex form of FIG. 3 when separated by punching its component parts.

Referring to the drawings, in the preparation of the annular blank for extrusion, the tube stock 1 or bar stock 2 is mounted in a lathe and the inner and outer diameters 3 and 4 of the terminal section 5 are machined down to the requisite dimensions whilst a parting off tool is introduced at the outside diameter to separate off the blank at 6.

The annular blank 5 is then subjected in turn to degreasing, barrelling, phosphating and soaping operations and finally extruded in a press to form the duplex structure 7 of FIG. 3. The duplex structure is then separated into two parts 7a and 7b by a punching operation in a press. In the embodiment shown, the portion 7b can then be positioned within the portion 7a to form the cone of a roller bearing whilst the portion 7a forms the cup.

Although the method as described is concerned with the manufacture of only two annular elements during each sequence of operations, clearly one or several annular elements could readily be produced with the appropriate extrusion tooling and with appropriately dimensioned annular blanks.

It will be seen that the method of the invention substantially reduces the number of operations required in order to produce the finished bearing rings from the starting stock. This is due to the fact that the earlier methods have been principally concerned with chipless forming of the annular blank so as to avoid wastage of the relatively expensive alloy steel which it is necessary to use, particularly for roller bearing rings. However the economic savings to be expected from the earlier practice is more than outweighed by the extensive preparatory operations necessary to form the annular blank by the earlier method. The preference for tube or bar stock is determined by the size of the bearing rings to be produced. With extremely small bearings, it is more economical to use steel bar but as the size increases, the economical advantages of the use of steel tubing outweigh those of bar.

The external and internal machining of the annular blank proposed as part of the process of the invention is particularly advantageous. This is due to the fact that metallurgical defects are most likely to be found near the surfaces of hot rolled tube or bar and the external and internal machining ensures that the defective metal portions are removed prior to the extrusion operation.

I claim:

1. A method of manufacturing a cup and cone for a tapered roller bearing from elongated stock; said method comprising: sizing the end of the elongated stock both internally and externally to prescribed diameters by machining; parting the sized end portion of the elongated stock from the remainder of stock to form an annular blank; degreasing, barrelling, phosphating, and soaping the annular blank; thereafter extruding the annular blank into a duplex structure having two axially offset segments of different diameters; and separating the axially offset segments in a punching operation, whereby the segment of greater diameter becomes the cup and the segment of lesser diameter becomes the cone.

2. A method of manufacturing bearing races from elongated steel stock, said method comprising: machining the stock both internally and externally to impart prescribed external and internal diameters to the end of the stock and to remove metallurgical defects from the stock; parting at least a portion of the machined portion to form an annular blank, cold extruding the machined annular blank into a multiplex structure having axially offset segments of annular shape and different diameters; and separating the segments of the multiplex structure in a punching operation, whereby the separated segments become bearing races.

3. A method of manufacturing bearing races from elongated steel stock, said method comprising: machining the stock both internally and externally for a short distance rearwardly from the end of the stock to impart prescribed external and internal diameters to the stock at its end only; parting the machined portion of the elongated stock to form an annular blank; cold extruding the machined annular blank into a multiplex structure having axially offset segments of annular shape and different diameters; and separating the segments of the multiplex structure in a punching operation, whereby the separated segments become bearing races.

4. The method claimed in claim 2 in which the steel stock is a seamless steel tube.

5. The method claimed in claim 2 in which the steel stock is a hot rolled steel bar.

6. The method claimed in any of claim 2 in which the multiplex structure is a duplex structure the portions of which when separated constitute the cup and the cone of a tapered roller bearing.

7. A method according to claim 3 wherein the stock is turned in a lathe as it is machined.

8. A method according to claim 7 wherein the annular blank is parted from the remainder of the elongated stock by introducing a parting off tool into the rotating stock.

* * * * *